US009470948B2

(12) United States Patent
Abe et al.

(10) Patent No.: US 9,470,948 B2
(45) Date of Patent: Oct. 18, 2016

(54) ELECTROPHORETIC DISPLAY BASE HAVING POROUS LID

(71) Applicant: SEIKO EPSON CORPORATION, Tokyo (JP)

(72) Inventors: Daisuke Abe, Chino (JP); Hiroki Nakahara, Shiojiri (JP); Kazuya Nakamura, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 219 days.

(21) Appl. No.: 13/799,704

(22) Filed: Mar. 13, 2013

(65) Prior Publication Data

US 2013/0271819 A1    Oct. 17, 2013

(30) Foreign Application Priority Data

Apr. 17, 2012 (JP) ................... 2012-093914

(51) Int. Cl.
 *G02B 26/00* (2006.01)
 *G02F 1/167* (2006.01)
(52) U.S. Cl.
 CPC ....... *G02F 1/167* (2013.01); *G02F 2001/1672* (2013.01); *G02F 2201/501* (2013.01); *Y10T 29/4998* (2015.01)
(58) Field of Classification Search
 CPC .................. G02F 1/167; G02F 26/00
 USPC ........ 359/290–298, 237–240, 242, 245, 246, 359/250–252, 349–384, 265–271; 1/290–298; 429/209, 246
 See application file for complete search history.

(56) References Cited

U.S. PATENT DOCUMENTS

| 7,136,216 | B1 * | 11/2006 | Daniel ................. G02B 26/004 359/290 |
| 2002/0008898 | A1 | 1/2002 | Katase |
| 2004/0057104 | A1 | 3/2004 | Ukigaya |
| 2010/0188731 | A1 * | 7/2010 | Kanematsu ............ G02F 1/167 359/296 |
| 2011/0090143 | A1 | 4/2011 | Paek et al. |
| 2011/0096388 | A1 * | 4/2011 | Agrawal et al. .............. 359/268 |

FOREIGN PATENT DOCUMENTS

| JP | H01-248183 | A | 10/1989 |
| JP | 2001-343672 | A | 12/2001 |
| JP | 2003-270673 | A | 9/2003 |
| JP | 2004-070273 | A | 3/2004 |
| JP | 2004287188 | A * | 10/2004 |
| JP | A-2004-287188 | | 10/2004 |
| JP | A-2005-128142 | | 5/2005 |
| JP | A-2005-266594 | | 9/2005 |
| JP | A-2006-071909 | | 3/2006 |
| JP | B2-4409154 | | 2/2010 |

* cited by examiner

*Primary Examiner* — Bumsuk Won
*Assistant Examiner* — Tamara Y Washington
(74) *Attorney, Agent, or Firm* — Oliff PLC

(57) ABSTRACT

An electrophoretic display base includes a base; a partition which is disposed on one surface of the base and in which the opposite side of the one surface is open; an electrophoretic dispersion liquid which contains a dispersion medium and charged particles filled in a cell on the base which is defined by the partition; and a lid which is disposed to block an opening of the partition, and has a porosity capable of passing the electrophoretic dispersion liquid therethrough.

15 Claims, 6 Drawing Sheets

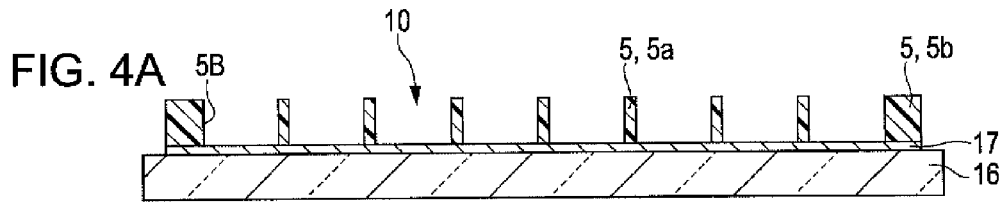
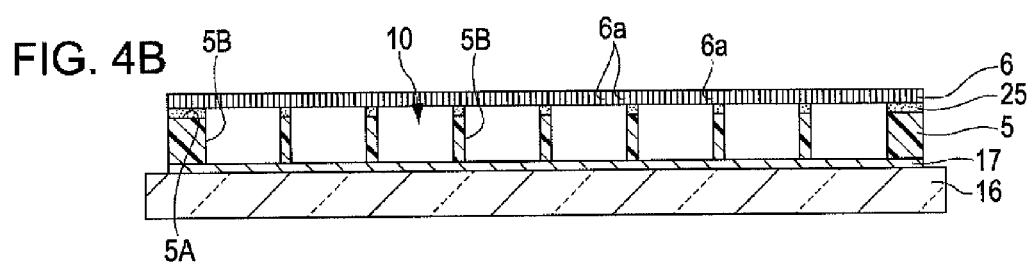
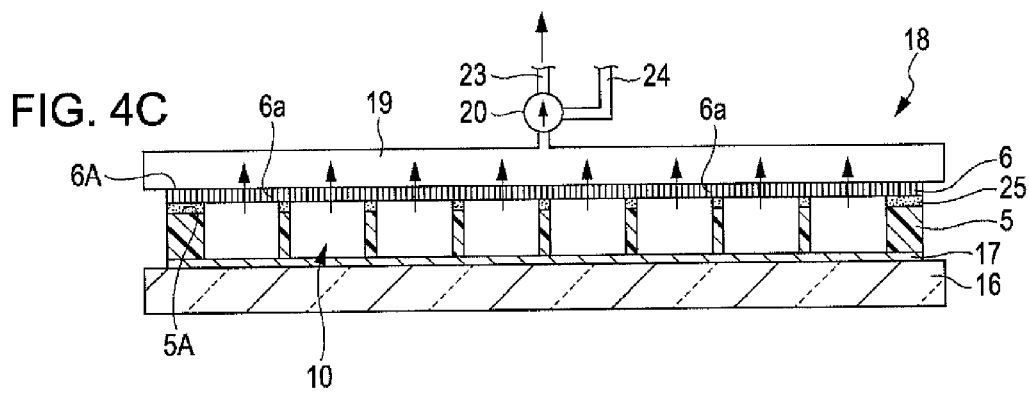
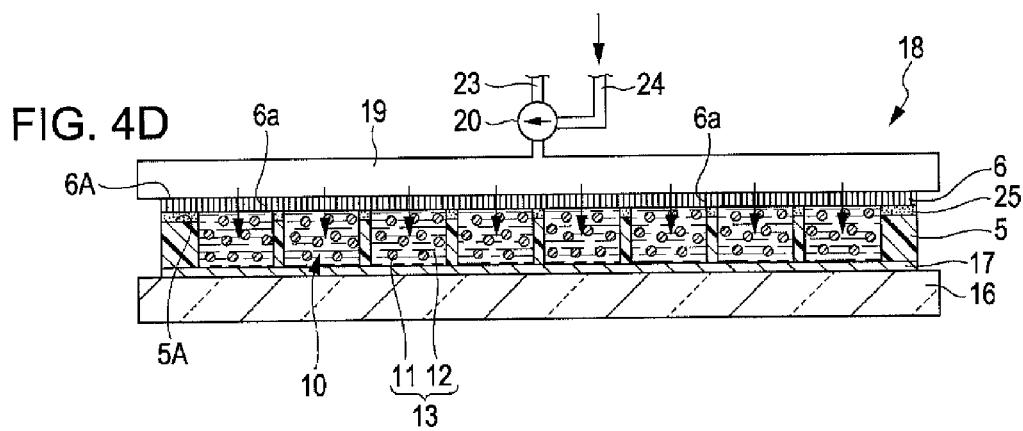

ELECTROPHORETIC DISPLAY BASE HAVING POROUS LID

BACKGROUND

1. Technical Field

The present invention relates to an electrophoretic display base and a manufacturing method thereof, and an electrophoretic display and a manufacturing method thereof.

2. Related Art

An electrophoretic display has a configuration in which an electrophoretic dispersion liquid is interposed between a pair of substrates each having an electrode. The electrophoretic display migrates charged particles of the electrophoretic dispersion liquid between the pair of substrates by generating an electric field between the electrodes of the pair of substrates, and thereby performing display using colors of the charged particles. In recent years, it is known that the electrophoretic display has a configuration in which the electrophoretic dispersion liquid is filled in a region surrounded by a partition.

JP-A-2004-287188 discloses an electrophoretic display in which a substrate and a partition are adhered to each other through an adhesive layer. Furthermore, in order not to reduce the adhesion force of the adhesive layer, JP-A-2004-287188 discloses how to control the thickness of the adhesive layer using thickness control means configured of beads.

However, although the thickness of the adhesive layer is controlled somehow, in a case where the electrophoretic dispersion liquid has been filled in the partition on a first substrate, and then a second substrate is placed on the electrophoretic dispersion liquid, there is a problem of considerable difficulty in adhering the second substrate to the partition.

SUMMARY

An advantage of some aspects of the invention is to provide an electrophoretic display base and a manufacturing method thereof, and an electrophoretic display and a manufacturing method thereof capable of reliably adhering a partition of one side to a substrate of the other side.

According to an aspect of the invention, there is provided an electrophoretic display base including: a base; a partition which is disposed on one surface of the base and in which the opposite side of the one surface is open; an electrophoretic dispersion liquid which contains a dispersion medium and charged particles filled in a cell on the base which is defined by the partition; and a lid which is disposed to block an opening of the partition, and has a porosity capable of passing the electrophoretic dispersion liquid therethrough.

The electrophoretic display base can be realized by the manufacturing method in which the electrophoretic dispersion liquid is filled in the cell defined by the partition through the porosity in the lid after the lid including the porosity capable of passing the electrophoretic dispersion liquid therethrough is disposed on the partition in a dried state. According to the electrophoretic display base, it is possible to suppress defects such as a leakage of the electrophoretic dispersion liquid out of the partition from occurring in a manufacturing process of the electrophoretic display.

The electrophoretic display base may further include a blocking member which blocks the porosity.

According to the aspect of the invention, the porosity in the lid is blocked by the blocking member, and therefore it is possible to prevent the electrophoretic dispersion liquid filled in the cell from leaking out through the porosity. Furthermore, it is also possible to suppress the volatilization of the electrophoretic dispersion liquid which is filled in the cell.

In the electrophoretic display base, the blocking member may be configured of an adhesive which is disposed on a surface of the lid on a side opposite to a side of the lid which faces the electrophoretic dispersion liquid.

According to the aspect of the invention, the electrophoretic display base is attached to a control substrate through the adhesive on the lid so that the electrophoretic display can be easily manufactured.

In the electrophoretic display base, the blocking member may be configured of a release film which is detachably disposed on a surface of the lid on a side opposite to a side of the lid which faces the electrophoretic dispersion liquid.

According to the aspect of the invention, the porosity in the lid is covered with the release film so that it is possible to protect a surface of the lid on a side opposite to a side of the lid which faces the electrophoretic dispersion liquid. By doing so, an electrophoretic display base alone may be easily handled so that an electrophoretic display base by itself can be circulated.

In the electrophoretic display base, the lid may be configured of a membrane filter including a plurality of the porosities.

According to the aspect of the invention, the lid configured of the membrane filter is used as a lid, and thereby an opening ratio per unit area in the lid becomes smaller than an opening ratio of the partition. Therefore, even in a case where the electrophoretic dispersion liquid is in contact with on one surface of the lid, which is the opposite side with respect to the partition, the adhesive and the blocking member may be successfully adhered to the lid.

In the electrophoretic display base, a relation of R≤2×T/(L×N×g) may be satisfied when a surface tension of the electrophoretic dispersion liquid is set to T, the longest diagonal distance of the cell is set to L, a specific gravity and a gravitational acceleration of the electrophoretic dispersion liquid are set to N and G respectively, and a radius of the porosity is set to R.

According to the aspect of the invention, the porosity dimension in the lid has such a configuration to satisfy the relation of the above expression that the electrophoretic dispersion liquid, filled in the cell, can be suppressed from leaking outside out of the porosities in the lid by a surface tension of the electrophoretic dispersion liquid even in a case where the posture has been changed.

According to another aspect of the invention, there is provided an electrophoretic display including the above-described electrophoretic display base, and a substrate, wherein an electrophoretic dispersion layer is interposed between the base and the substrate.

According to the aspect of the invention, since being able to perform a display of high quality, an electrophoretic display which is high in reliability can be provided.

According to still another aspect of the invention, there is provided a method of manufacturing an electrophoretic display base including disposing a partition, in which the opposite side of one surface of a base is open, on the one surface; arranging a lid which has a porosity capable of passing an electrophoretic dispersion liquid therethrough so as to block a cell on the base defined by the partition; and filling the electrophoretic dispersion liquid into the cell through the porosity by arranging the electrophoretic dispersion liquid on one surface of the lid.

According to the aspect of the invention, after the lid including the porosity capable of passing the electrophoretic dispersion liquid is disposed on the partition in a dried state, the electrophoretic dispersion liquid is filled in the cell defined by the partition through the porosity in the lid. As a result, in a state where the surface of the partition is wet, a process of bonding another base (another substrate or the like for the electrophoretic display) may not exist, and thereby another base (another substrate or the like for the electrophoretic display) can be successfully bonded on the partition. Consequently, it is possible to suppress defects such as a leakage of the electrophoretic dispersion liquid from the partition and a deterioration of sealing properties of the cell from occurring.

The method of manufacturing an electrophoretic display base may further include blocking the porosity after the filling of the electrophoretic dispersion liquid into the cell.

According to the aspect of the invention, the electrophoretic dispersion liquid is filled in the cell, and thereafter the porosity in the lid may be blocked. By doing so, it is possible to prevent the electrophoretic dispersion liquid from leaking out of the porosity, and from being volatile.

In the method of manufacturing an electrophoretic display base, in the blocking of the porosity, an adhesive layer and a release film may be sequentially disposed on a surface of the lid on a side opposite to a side of the lid which faces the electrophoretic dispersion liquid.

According to the aspect of the invention, the plurality of porosities in the lid are blocked by the adhesive layer so that it is possible to prevent the electrophoretic dispersion liquid, filled in the cell, from leaking out through the porosity. Furthermore, it is possible to protect the surface of the lid on a side opposite to a side of the lid which faces the electrophoretic dispersion liquid.

In the method manufacturing of an electrophoretic display base, in the blocking of the porosity, a release film, provided with an adhesive layer, may be disposed on the surface of the lid on a side opposite to a side of the lid which faces the electrophoretic dispersion liquid.

According to the aspect of the invention, by using the release film, integrated with the adhesive layer in advance, the time taken for applying the adhesive on the partition can be saved, and also rapid blocking of the porosity in the lid can be obtained after the filling of the electrophoretic dispersion liquid.

In the method of manufacturing an electrophoretic display base, in the blocking of the porosity, the lid may be expanded due to heat, thereby blocking the porosity.

According to the aspect of the invention, it is not necessary to dispose the blocking member by blocking the porosity in the lid, which is expanded due to the heat, or the like. Therefore, the cost may be reduced, and all the bases can be thinner.

In the method of manufacturing an electrophoretic display base, in the filling of the electrophoretic dispersion liquid, after the pressure inside the cell is in a reduced state, the electrophoretic dispersion liquid may be filled in the cell through the porosity.

According to the aspect of the invention, the pressure inside the cell is in a reduced state, and then the electrophoretic dispersion liquid is sucked into the cell through the porosity in the lid, thereby preventing bubbles from being mixed into the cell. Also, the time required for filling the electrophoretic dispersion liquid, can be shortened.

The method of manufacturing an electrophoretic display base may further include removing bubbles in the electrophoretic dispersion liquid by heating the electrophoretic dispersion liquid after the filling of the electrophoretic dispersion liquid into the cell.

According to the aspect of the invention, the electrophoretic dispersion liquid is heated to expand so that it is possible to remove the bubbles in the electrophoretic dispersion liquid efficiently.

According to still another aspect of the invention, there is provided a method of manufacturing an electrophoretic display, including: manufacturing in which an electrophoretic material layer is interposed between a pair of substrates using an electrophoretic display base manufactured by the above-described method of manufacturing an electrophoretic display base and at least one substrate.

According to the aspect of invention, since being able to perform a display of high quality, the electrophoretic display which is high in reliability can be manufactured.

BRIEF DESCRIPTION OF THE DRAWINGS

The invention will be described with reference to the accompanying drawings, wherein like numbers reference like elements.

FIGS. 4A to 4D are cross-sectional views illustrating a manufacturing method of the electrophoretic display of the embodiment in a process order.

FIG. 10A is a perspective view illustrating an e-book, FIG. 10B is a watch, and FIG. 10C is an electronic paper.

DESCRIPTION OF EXEMPLARY EMBODIMENTS

Hereinafter, an embodiment of the invention will be described with reference to FIGS. 1 to 7.

In this embodiment, an exemplary electrophoretic display in an active matrix form, and an manufacturing method thereof will be included.

Figure 1:
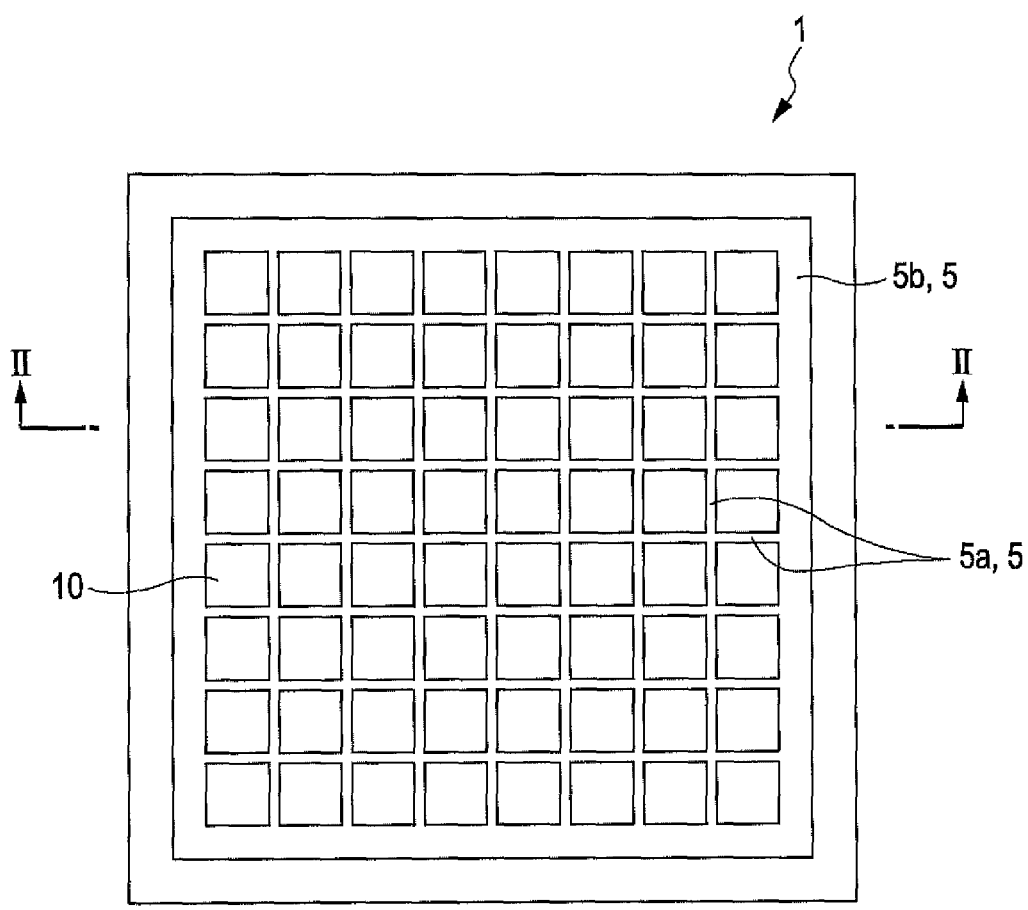
FIG. 1 is a plan view illustrating an electrophoretic display according to an embodiment of the invention.

FIG. 1 is a plan view illustrating the electrophoretic display the embodiment of according to the invention. FIGS. 2 to 7 are cross-sectional views along the line II-II of FIG. 1.

Furthermore, in order to easily see each element in the following drawings, the reduced scale of dimension is shown differently for each element.

Figure 2:
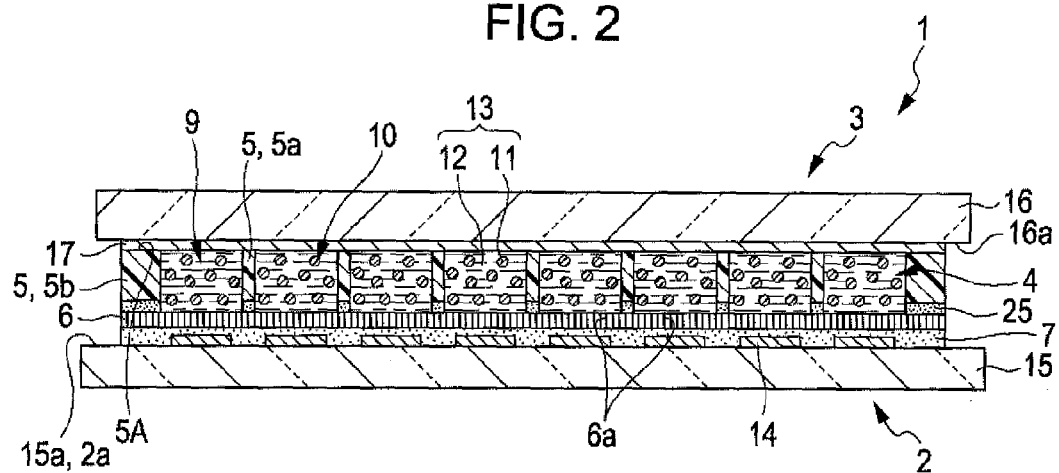
FIG. 2 is a cross-sectional view along the line II-II of FIG. 1.

An electrophoretic display 1 according to the embodiment, as illustrated in FIG. 2, is provided with a thin film transistor (hereinafter, abbreviated as TFT) array substrate (substrate) 2, an opposing substrate (substrate) 3, an electrophoretic material layer 4, a partition 5, a membrane filter (lid) 6, and an adhesive layer 7. The TFT array substrate 2 and the opposing substrate 3 are opposed to each other, and bonded to each other at a predetermined interval with the partition 5 disposed between the TFT array substrate 2 and the opposing substrate 3. That is, the TFT array substrate 2 and the opposing substrate 3 are maintained at a predetermined interval by the partition 5.

As shown in FIG. 1, the partition 5 is disposed in a lattice pattern extending in a first direction and a second direction (a horizontal direction and a vertical direction in FIG. 1) which are orthogonal to each other. Out of the partition 5, the outermost peripheral portion 5b is formed wider than the other portion 5a. The partition 5 is formed on the side of the opposing substrate 3 with the side of the TFT array substrate 2 being open. The opening of the partition 5 is blocked by the membrane filter 6, which will be described later. As a material for the partition 5, for example, a sealing material of a liquid crystal panel or the like can be used, for example, a UV-curable acrylic resin, or a thermosetting epoxy resin may also be used. A cell 10, defined by the partition 5, configures one pixel region. Specifically, in the space between the TFT array substrate 2 and the opposing substrate 3, a rectangular region, surrounded by the partition 5a extending in the first direction and the partition 5a extending in the second direction, is referred to as the cell 10.

An electrophoretic dispersion liquid 13 containing a dispersion medium 12 and charged particles 11 is filled in a plurality of the cells 10. The electrophoretic material layer 4 is configured of the electrophoretic dispersion liquid 13 which is sealed between the TFT array substrate 2 and the opposing substrate 3. In the following description, surfaces of sides of the TFT array substrate 2 and the opposing substrate 3, which are in contact with the electrophoretic material layer 4 are respectively referred to as an inner surface.

There are data lines (not shown), scan lines, TFT or the like formed on an inner surface 15a (one surface) of a base 15 configuring the TFT array substrate 2. The configuration of the TFT array substrate 2 is well known so that a detailed description is omitted. However, a plurality of the data lines and a plurality of the scan lines are arranged to intersect each other so that each region, surrounded by the scan lines and the data lines adjacent to each other, become a pixel 9. The TFT is arranged in each pixel 9, and a pixel electrode 14 is connected to each TFT. However, as shown in FIG. 2, a plurality of the pixel electrodes 14 are formed on the inner surface 2a of the TFT array substrate 2.

The base 15 is configured of, for example, a glass substrate. However, as a material of the base 15, another material, for example, a plastic substrate can also be used without being limited to the glass substrate. Furthermore, since the base 15 is located on a side opposite to a side which an observer can visually recognize, the base may not necessarily be a transparent material. The pixel electrode 14, for example, is configured of a transparent conductive film such as an indium Tin Oxide (hereinafter, abbreviated as ITO). As the material of the pixel electrode 14, without being limited to the ITO, another transparent conductive film can be used. Also, for the same reason as the base 15, a material of the pixel electrode 14 may not necessarily be a transparent conductive material.

As shown in FIG. 2, a common electrode 17 is formed on an inner surface 16a of a base 16 configuring the opposing substrate 3. The common electrode 17 is an electrode common to all the pixels 9, being formed over at least the entire display region. The base 16 is configured of, for example, a glass substrate. As a material of the base 16, another material, for example, a plastic substrate can be used without being limited to the glass substrate. The common electrode 17 is configured of, for example, a transparent conductive film such as ITO. Also, as a material of the common electrode 17, other transparent conductive films, for example, a Indium Zinc Oxide (hereinafter, abbreviated as IZO) or the like can also be used without being limited to ITO. Since the base 16 and the common electrode 17 are located on the side which the observer can visually recognize, it is necessary to use a transparent material.

Materials of the pixel electrode 14 and the common electrode 17 are selected so as to make a difference of Fermi levels between the pixel electrode 14 and the common electrode 17 small. The difference of Fermi level is a DC voltage, thereby causing the electrode to corrode. For example, in a case where the electrode of ITO and an aluminum electrode are formed, the corrosion caused by the DC voltage is well known. For this reason, it is most preferable that materials of pixel electrode 14 and common electrode 17 be the same.

The electrophoretic dispersion liquid 13 configuring the electrophoretic material layer 4 contains the transparent dispersion medium 12, and the charged particles 11 which is positively charged dispersed in the dispersion medium 12. The dispersion medium 12 is configured of, for example, petroleum solvents such as silicon oil, or Isopar (product of ExxonMobil Chemical Co.). The charged particles 11 are configured of, for example, a charged group formed on the surface of acrylic particles.

The charged particles 11 can migrate between the pixel electrode 14 and the common electrode 17 on the basis of a potential difference between the pixel particles 14 and the common electrode 17. In addition, the charged particles 11 can be electrically adsorbed with respect to the pixel electrode 14 and the common electrode 17. In addition to the charged particles 11, the uncharged particles, or negatively charged particles having a different color from the positively charged particles may also be included. The charged degree and dispersion degree of the electrophoretic dispersion liquid 13 can be adjusted by a charge control agent or a dispersant which is added to the electrophoretic dispersion liquid 13.

The membrane filter 6 is arranged between the TFT array substrate 2 and the electrophoretic material layer 4 so as to block the opening of the partition 5. The membrane filter 6 is bonded to the end portion of the partition 5 on a side opposite to the opposing substrate 3 through an adhesive layer 25.

The membrane filter 6 is a porous membrane body including a plurality of porosities 6a enabled to pass the electrophoretic dispersion liquid 13 including the charged particles 11 therethrough. As an exemplary dimension, while the charged particles 11 have a diameter of about several hundred nm, the membrane filter 6 has a porosity diameter of one to several tens of μm. As a membrane filter 6, products with various types of porosity diameters or material qualities are available in the market. Therefore, by considering the combination of the charged particles 11 or the dispersion medium 12 being used, a product can be appropriately selected. As the material quality of the membrane filter 6, as long as it is not affected by the electrophoretic dispersion liquid 13 or the adhesive, for example, an organic material such as polypropylene, polycarbonate, polysulfone may be included.

The size of the porosities 6a in the membrane filter 6 used in this embodiment is set according to a surface tension, a specific gravity and a gravitational acceleration of the electrophoretic dispersion liquid 13, and a size of cell 10. When a radius of the porosities 6a is set to R, the surface tension of the electrophoretic dispersion liquid 13 is set to T, the specific gravity of the electrophoretic dispersion liquid is set to N, the gravitational acceleration of the electrophoretic dispersion liquid 13 is set to g, and the longest diagonal distance of the cell 10 is set to L, $$R \leq 2 \times T/(L \times N \times g) \quad (1)$$

the relation of the Expression 1 may be satisfied.

By doing so, in a manufacturing process, even when the base 16 in which the electrophoretic dispersion liquid 13 is filled in the cell 10 is tilted, it is possible to prevent the electrophoretic dispersion liquid 13 from leaking out of the porosities 6a of the membrane file 6 due to the surface tension of the electrophoretic dispersion liquid 13.

The TFT array substrate 2 is bonded to the surface of the membrane filter 6 by the adhesive layer (blocking member) 7.

Figure 3:
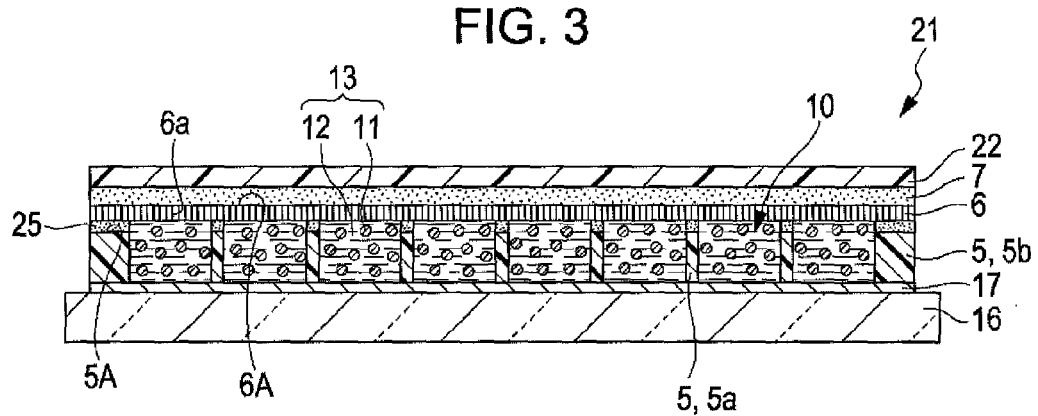
FIG. 3 is a cross-sectional view illustrating an electrophoretic display base of the embodiment.

FIG. 3 is a cross-sectional view of an electrophoretic display base 21 used to manufacture the electrophoretic display 1 according to this embodiment. Out of the electrophoretic display base 21, the configuration from the base 16 to the adhesive layer 7 which configures the opposing substrate 3 of the electrophoretic display 1 is the same as described above. By doing so, the electrophoretic display base 21 includes the common electrode 17. When being handled as the electrophoretic display base 21, a protective film (blocking member, release film) 22 is disposed on a surface 6A of the membrane filter 6 on a side opposite to a side of the membrane filter which faces the electrophoretic dispersion liquid 13. The protective film 22 is, for example, a resin film, thereby capable of being detached easily from the membrane filter 6 as necessary.

Hereinafter, a method of manufacturing the electrophoretic display 1 according to this embodiment will be described with reference to FIGS. 4A to 7.

Furthermore, a process of manufacturing the electrophoretic display 1 includes a method of manufacturing the electrophoretic display base 21.

First, as shown in FIG. 4A, a transparent conductive film such as the ITO is formed on one side of the transparent base 16 using a sputtering method or the like, and the common electrode 17 is formed by patterning a conductive film.

Subsequently, a photosensitive resin film formed of photosensitive acrylic resin is formed on one side of the base substrate 16 (one side of the common electrode 17), and the partition 5 (5a, 5b) is formed with one surface and the opposite side being open.

Subsequently, as shown in FIG. 4B, the adhesive is transferred on an upper surface 5A of the partition 5 to form the adhesive layer 25, and then the membrane filter 6 including a plurality of the porosities 6a enabled to pass the electrophoretic dispersion liquid 13 including the charged particles 11 therethrough is adhered to the adhesive layer so as to block openings 5B of a plurality of cells 10.

Subsequently, as shown in FIG. 4C, a dispersion liquid filling device 18 is installed on an upper surface 6A of the membrane filter 6. The dispersion liquid filling device 18 includes an adsorption portion 19, a switching valve 20, a vacuum suction flow path 23 connected to a vacuum source which is not shown, and a dispersion liquid supply flow path 24 connected to a dispersion liquid storage tank which is not shown.

The switching valve 20 selectively switches the vacuum suction flow path 23 and the dispersion liquid supply flow path 24 on the basis of an instruction of a control device which is not shown. By doing so, the adsorption portion 19 side is controlled so that the adsorption portion 19 side becomes the state of a positive and negative pressure, and an atmospheric pressure.

In a case where the electrophoretic dispersion liquid 13 is filled in a plurality of the cells 10, first, the adsorption portion 19 of the dispersion liquid filling device 18 is installed so as to be brought into contact with the upper surface 6A of the membrane 6. Thereafter, the cell space surrounded by the base 16, the membrane filter 6 and the partition 5 becomes a negative pressure by the control of the control device in which a contact direction of the switching valve 20 is switched to the vacuum suction flow path 23, and thereby being vacuum-sucked from the porosities 6a of the membrane filter 6.

It is preferable that as a vacuum condition air be exhausted to a level of 100 Pa or below in order to remove the air inside the cell.

Subsequently, as shown in FIG. 4D, in a case where the electrophoretic dispersion liquid 13 is filled in a plurality of cells 10 through a plurality of porosities 6a of membrane filter 6, the connection direction of the switching valve 20 is switched to a dispersion liquid supply flow path 24. At this time, a difference of pressures between the dispersion liquid 13 to be supplied and the inside of the cell 10 is set to exceed a bubble point determined by the combination of the membrane filter 6 and the dispersion liquid 13. By doing so, the dispersion liquid 13 passes through the membrane filter 6, and thereby the dispersion liquid is filled in all of the cells 10 on the base 16.

At this time, in order to prevent the bubbles from being filled in the cell 10, all of the base 16 may be heated to a predetermined temperature using a heater or the like. By heating the electrophoretic dispersion liquid 13 indirectly, the liquid is expanded, and the bubbles mixed in the electrophoretic dispersion liquid 13 are pushed out of the porosities 6a of the membrane filter 6. By doing so, the bubble inside the liquid can be removed efficiently.

In this way, by using a method that the electrophoretic dispersion liquid 13 is filled in the cell 10 of a vacuum state through the porosities 6a of the membrane filter 6, thereby suppressing the bubbles from being mixed into the cell 10. Also the time, required for filling the electrophoretic dispersion liquid 13 can be shortened.

A method of filling the electrophoretic dispersion liquid 13 is not limited to the method described above, for example, a method of disposing the base 16 in which the membrane filter 6 is provided on the partition 5 in a vacuum chamber and placing the base under a vacuum atmosphere may be used. In this case, for example, the base 16 having the membrane filter 6 on the partition 5 in the vacuum chamber is submerged in a tank filled with the electrophoretic dispersion liquid 13, thereby being filled with the electrophoretic dispersion liquid 13. At this time, a pressure may be applied as necessary. It may be performed in the vacuum state from the process of causing the membrane filter 6 to be adhered to the partition 5.

Figure 5:
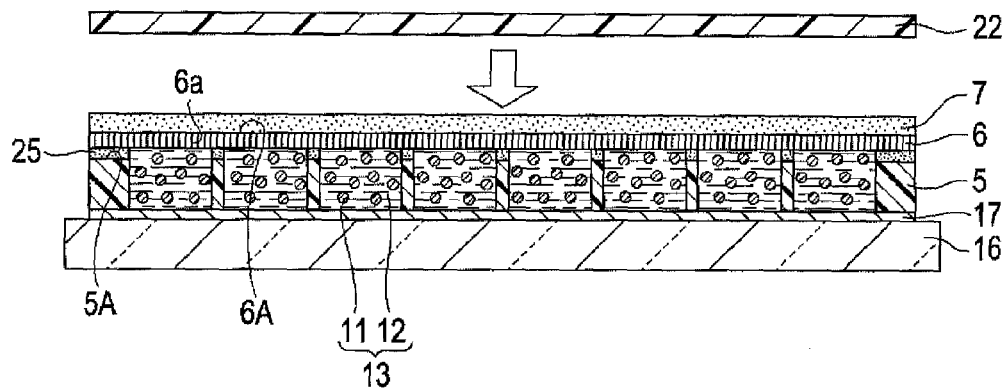
FIG. 5 is a cross-sectional view illustrated sequent to the process order of FIG. 4.

Subsequently, as shown in FIG. 5, the adhesive is applied to form an adhesive layer 7 on the surface 6A of the membrane filter 6 on a side opposite to the surface side of the membrane filter which is in contact with the electrophoretic dispersion liquid 13. Thereafter, the protective film (release film) 22 is disposed on the membrane filter 6 through the adhesive layer 7. Here, in the former process, with the filling of the electrophoretic dispersion liquid 13, the upper surface 6A of the membrane filter 6 has been wet.

However, even in this condition, an opening ratio per unit area of the membrane filter is smaller than the opening ratio of the partition 5, thus, the adhesive can be easily attached to the upper surface 6A of the membrane filter 6, and the adhesive layer 7 can be formed thereon. As necessary, the electrophoretic dispersion liquid 13 which is attached to the upper surface 6A of the membrane filter 6 may be scraped.

In this way, a plurality of porosities 6a of the membrane filter 6 are blocked by the adhesive layer 7 and the protective film 22 so that it is possible to prevent the electrophoretic dispersion liquid 13 from leaking through the porosities 6a of the membrane filter 6. In addition, the porosities 6a of the membrane filter 6 are blocked by these adhesive layers 7 and the protective film 22, which causes an effect of preventing volatilization of the electrophoretic dispersion liquid 13 inside the cell 10.

Figure 6:
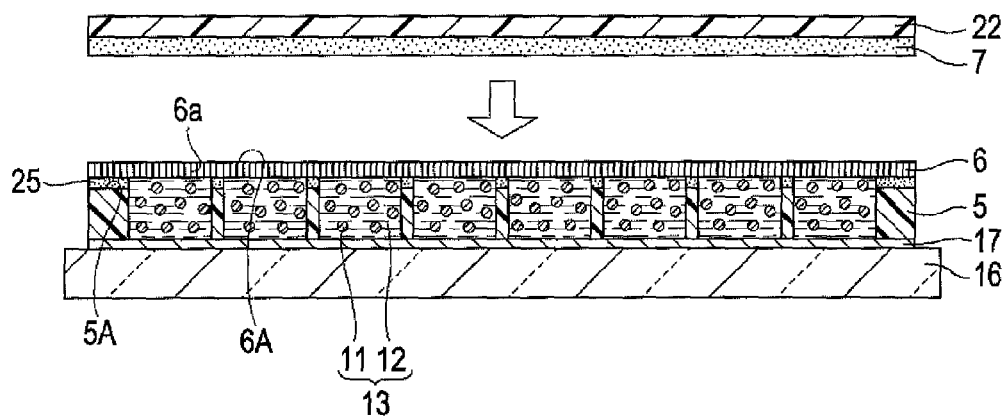
FIG. 6 is a cross-sectional view illustrating another manufacturing method.

In addition, with respect to a method of blocking the porosities 6a of the membrane filter 6, for example, as shown in FIG. 6, without being limited to the above-described, it may be allowed to use a method that the adhesive layer 7 is disposed on one side of the protective film 22 in advance. By doing so, the time taken for applying the adhesive on the partition 5 can be saved, and also the rapid blocking of the porosities 6a of the membrane filter 6 can be obtained after the electrophoretic dispersion liquid 13 is filled.

Alternatively, a method of blocking the porosities 6a by heating the membrane filter 6 so as to expand may be used. By doing so, it is not necessary to dispose the blocking member such as the adhesive layer 7 or the protective film 22, and therefore the cost may be reduced, and all the substrates can be thinner.

With the process above, the electrophoretic display base 21 shown in FIG. 3 is completed.

Since the electrophoretic display base 21 has a configuration in which the outer surface of a side opposite to the base 16 is protected by the protective film 22, the electrophoretic display base alone can be easily handled. For this reason, the electrophoretic display base 21, being in a state where the electrophoretic dispersion liquid 13 is sealed inside the cell 10, can be circulated, thereby capable of being bonded on an arbitrary control substrate. In a case where there is no need for the circulation, the control substrate (TFT array substrate 2) may be directly bonded in place of the protective film 22.

When electrophoretic display 1 is manufactured using the electrophoretic display base 21, the protective film 22 of the electrophoretic display base 21 is detached, then the TFT array substrate 2 which is separately prepared is attached to the electrophoretic display base material 21 through the adhesive layer 7.

With the process above, the electrophoretic display 1 shown in FIG. 2 is completed.

In this embodiment, before the electrophoretic dispersion liquid 13 is filled in the cell 10, the membrane filter 6 is disposed on the upper surface 5A of the partition 5 on the substrate 16 through the adhesive layer 25, and thus the upper surface 5A of the partition 5 can be covered by the adhesive layer 25. For this reason, when the electrophoretic dispersion liquid 13 is filled, it is possible to prevent the upper surface 5A of the partition 5 from being wet. In addition, since the membrane filter 6 is disposed in a state where the upper surface 5A of the partition 5 is dried, the membrane filter 6 with respect to the partition 5 can be surely fixed.

In this embodiment, the electrophoretic dispersion liquid 13 is filled in the cell 10 through a multitude of porosities 6a of the membrane filter 6, and thereby the upper surface 6A of the membrane filter 6 has been wet to some extent. However, even in this condition, since the bonding area is wide, the adhesive is successfully adhered, and the protective film 22 can be easily bonded through the adhesive layer 7. In this way, it is possible to prevent the electrophoretic dispersion liquid 13 filled in the cell 10 from leaking through the porosities 6a. In addition, with blocking of the porosities 6a, it is also possible to suppress the volatilization of the electrophoretic dispersion liquid 13 which is filled in the cell 10.

In this way, in the manufacturing method of the embodiment, in a state where the upper surface 5A of the partition 5 is wet with the electrophoretic dispersion liquid 13, since a process of bonding the other substrate (TFT array substrate 2) exists, the TFT array substrate 2 and the opposing substrate 3 are surely bonded to each other through the partition 5. In this way, it is possible to suppress defects such as a leakage of the electrophoretic dispersion liquid 13 from the partition 5 and a deterioration of sealing properties of the cell 10 from occurring. As a result, it is possible to realize the electrophoretic display 1 which performs a display of high quality, and is excellent in reliability. In addition, since the base 16 of the electrophoretic display base 21 can be used as the opposing substrate 3 of the electrophoretic display 1 as it is, the manufacturing process can be simplified.

In addition, in this embodiment, the dimension of the porosities 6a of the membrane filter 6 has a such a configuration to satisfy the relation of the Expression 1 that the surface tension of the electrophoretic dispersion liquid 13 can be operative, and the electrophoretic dispersion liquid 13, filled in the cell 10, can be suppressed from leaking outside out of the porosities 6a of the membrane filter 6 even in a case where the posture of the base 16 has been changed and there has been a vibration to some extent in the manufacturing process.

Figure 7:
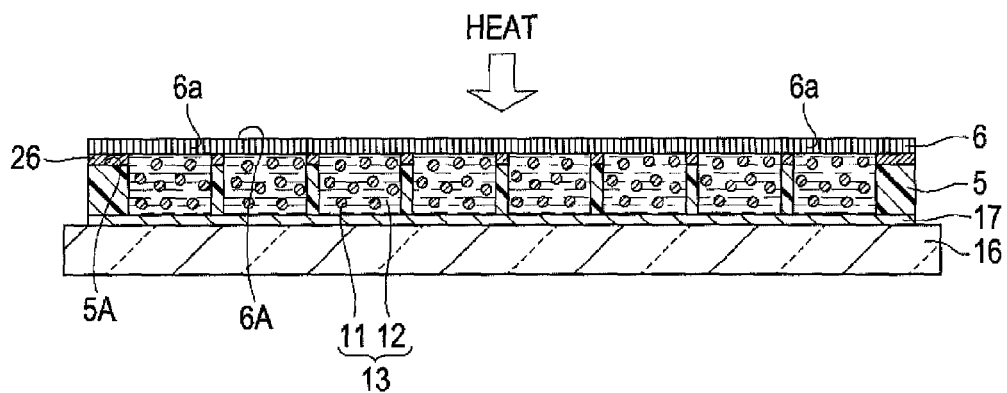
FIG. 7 is a cross-sectional view illustrating another manufacturing method.

Furthermore, with respect to a method of fixing the membrane filter 6 to the upper surface 5A of the partition 5, other than the above-described, for example, as shown in FIG. 7, the membrane filter 6 is disposed on the upper surface 5A of the partition 5 and then heated to perform a thermal adhesion. By doing so, the membrane filter 6 may be fixed to the upper surface 5A of the partition 5.

In this case, since a part of the membrane filter 6 is melted and a possible adhesive membrane 26 is formed on the upper surface 5A of the partition 5, the dispersion medium 12 is not in direct contact with the upper surface 5A when the electrophoretic dispersion liquid 13 is filled. In this way, when the membrane filter 6 is fixed to the upper surface 5A of the partition 5 before the electrophoretic dispersion liquid 13 is filled, the upper surface 5A may be wet, and thus a decrease in bonding strength caused by being wet of the upper surface 5A can be prevented.

Furthermore, with respect to a heating temperature, the porosities 6a are heated to the degree of a temperature at which the porosities 6a are not blocked according to the expansion of the membrane filter 6.

As the other method, after the electrophoretic dispersion liquid 13 is supplied to the upper surface 6A of the membrane filter 6 under an atmospheric pressure, all the base 16 may be joined into a vacuum chamber and a pressure in the cell space is reduced, and thus the electrophoretic dispersion liquid 13 on the upper surface 6A may also be sucked into the cell 10 through the porosities 6a. In this case, the electrophoretic dispersion liquid 13 is filled in the cell 10 through the porosities 6a, when a vent operation is performed in which the vacuum chamber is returned to the atmospheric pressure after the inside of the cell 10 becomes a vacuum state. At this time, a differential pressure equal to or more than the bubble point applies from the outside of the cell 10 to the electrophoretic dispersion liquid 13, and the electrophoretic dispersion liquid 13 is sucked into the cell 10 from the porosities 6a.

EXAMPLES

Figure 8:
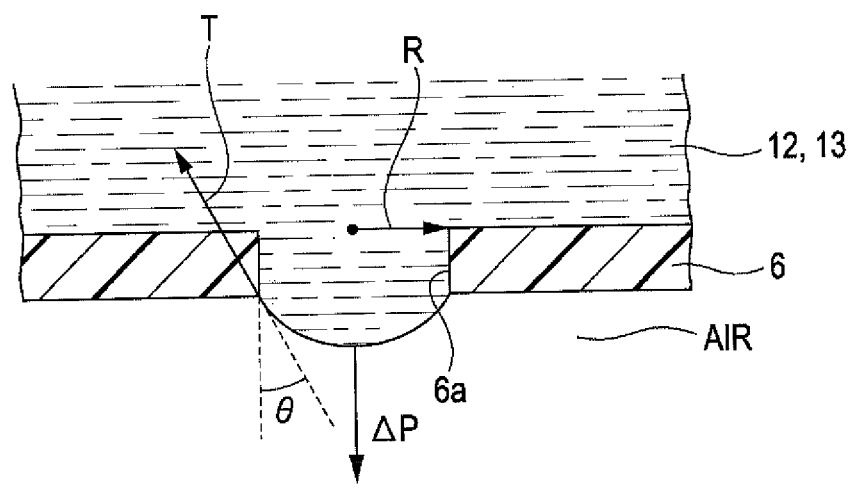
FIG. 8 is a cross-sectional view illustrating a surface tension applied on a liquid surface of a porosity.

FIG. 8 is a cross-sectional view illustrating a surface tension applied on the liquid surface in the porosity of the membrane filter.

Here, with reference to FIG. 8, the relation of power applied on the liquid surface of the porosities 6a of the membrane filter 6 is described.

In a case where the pressure of the electrophoretic dispersion liquid 13 is higher than an atmospheric pressure, when the differential pressure of the power which causes the electrophoretic dispersion liquid 13 to leave from the porosities 6a to outside is $\Delta P$, the power becomes $\Delta P \times \pi R^2$. On the other hand, the sum of the surface tension thereagainst is $2\pi RT \cos \theta$. That is, if the relation $$2\pi RT \cos \theta \geq \Delta P \times \pi R^2 \quad (2)$$

is obtained, the electrophoretic dispersion liquid 13 does not pass through the porosities 6a of the membrane filter 6 of the base 16.

In a case where the above-mentioned Expression 2 does not work out, the electrophoretic dispersion liquid 13 passes through the porosities 6a.

When Expression 2 is represented with respect to the radius R of the porosities 6a, the relation $$R \leq 2T \cos \theta / \Delta P \quad (3)$$

is obtained. Since the maximum for the $\cos \theta$ is 1, as long as the relation $$R \leq 2T/\Delta P \quad (4)$$

is obtained, the electrophoretic dispersion liquid 13 cannot pass through the porosities 6a.

On the other hand, when the electrophoretic dispersion liquid 13 is filled in the cell 10, the maximum pressure generated by the own gravity of the liquid is L×N×g if the longest diagonal difference of the cell 10 is set to L, a specific gravity is set to N, and a gravitational acceleration is set to g. Accordingly, if this is substituted for Expression 4, it becomes $R \leq 2T/(L \times N \times g)$, which is equivalent to Expression 1.

Therefore, in order for the electrophoretic dispersion liquid 13 filled in the cell 10 not to spill out from the porosities 6a, whatever direction the base 16 may be tilted, it is necessary to prepare the membrane filter 6 having such a porosity diameter to satisfy the above-described Expression 1.

In the embodiment to be described below, silicone oil is used as a dispersion medium 12 of the electrophoretic dispersion liquid 13. The silicone oil has the surface tension of 20 mN/m. From Expression 3 described above, by a differential pressure of equal to or more than $2T \cos \theta/R$ being applied with respect to the electrophoretic dispersion liquid 13, it is possible to pass through the porosities 6a.

For example, if R=5 µm, $\cos \theta=1$, since the pressure of equal to or more than $2\times20\times10^{-3}\times1/(5\times10^{-6})=8\times10^3$ (Pa) is applied to the electrophoretic dispersion liquid 13, it is possible to pass through the porosities 6a. Accordingly, the bubble point is $8\times10^3$ (Pa).

In addition, in a case where the longest diagonal distance L of the cell 10 is 500 µm, since the maximum pressure due to the own weight when the electrophoretic dispersion liquid 13 is filled in the cell 10 is L×N×g as described above, if the specific gravity N is 1 and the gravitational acceleration g is 9.8 (m/s²), the pressure becomes $$500\times10^{-6}\times1\times9.8=4.9\times10^{-3} \text{ (Pa)}.$$

Accordingly, since the maximum pressure due to the own weight is much smaller than the above-described bubble point $8\times10^3$ (Pa), the electrophoretic dispersion liquid 13 filled in the cell 10 is not spilled out from the cell 10 even when the base 16 is tilted or upside down during transport.

Furthermore, the technical scope of the invention is not limited to the embodiments described above, and various types of modifications can be applied in the scope without deviating from the purpose of the invention.

Figure 9:
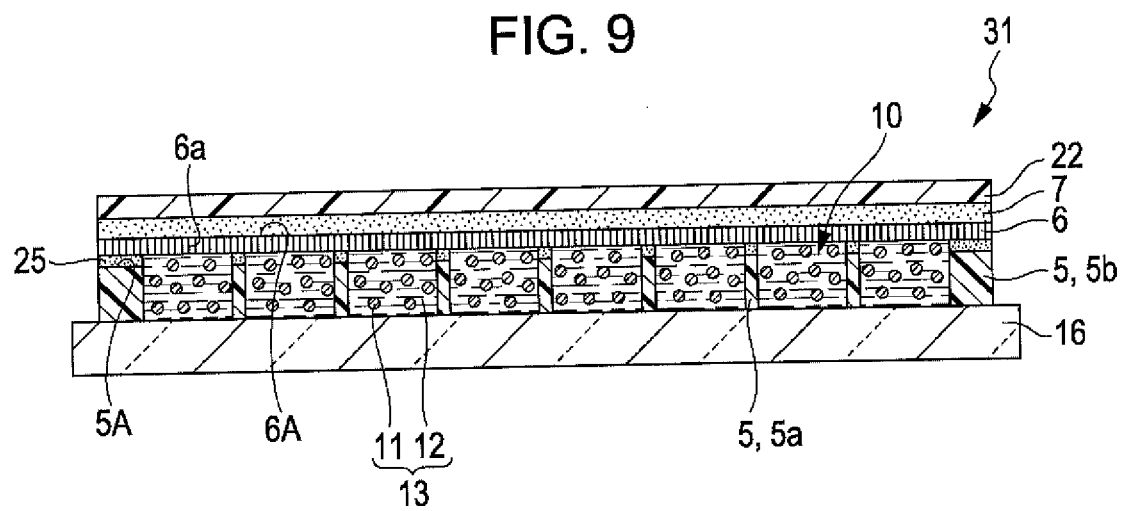
FIG. 9 is a cross-sectional view illustrating an electrophoretic display base of another example.

For example, in the embodiments described above, the examples are shown in which the common electrode is formed on one surface of the base configuring the electrophoretic display base and the base is used as the opposing substrate of the electrophoretic display as it is. In place of this configuration, for example, as shown in FIG. 9, an electrophoretic display base 31 in which the common electrode is not formed on one surface of the base 16 may be used. However, when the electrophoretic display is manufactured using the electrophoretic display base 31, after the protective film 22 is detached with respect to the electrophoretic display base 31, it is necessary to bond the opposing substrate having the common electrode in addition to the TFT array substrate.

Furthermore, in the above-described embodiment, an example using the porous membrane as a lid has been enumerated. However, as the lid, a mesh member, and a resin member with a pattern formed with a plurality of porosities may also be included.

In the above-described embodiment, an example of the electrophoretic display in the active method has been enumerated. However, the aspect of the invention can be applied to the electrophoretic display of a passive matrix type having a stripe-shaped electrode to each of a pair of substrates, or to the electrophoretic display of a segment type. In addition, with respect to numbers, arrangements materials, methods of forming or the like for various types of elements of the electrophoretic display, without being limited to the above-described embodiment, appropriate changes can be applied.

Furthermore, the manufacturing method according to the embodiment can be applicable to not only the electrophoretic display (EPD), to but also a device in which a liquid is needed to be sealed in the cell such as an electrochromic display (ECD).

Electronic Apparatus

Subsequently, a case in which the electrophoretic display according to each embodiment of the invention is applied to an electronic apparatus will be described.

Figure 10A:
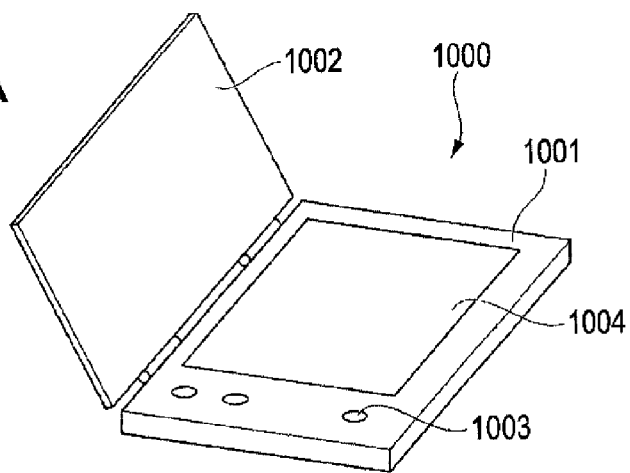
FIGS. 10A to 10C are perspective views illustrating electronic apparatuses of specific examples to which an electrophoretic device according to an aspect of the invention is applied, where
Figure 10B:
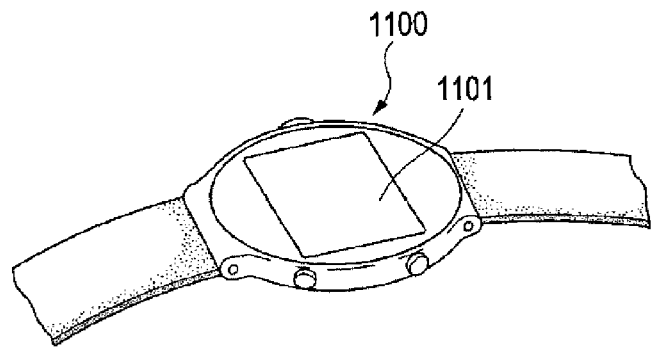
Figure 10C:
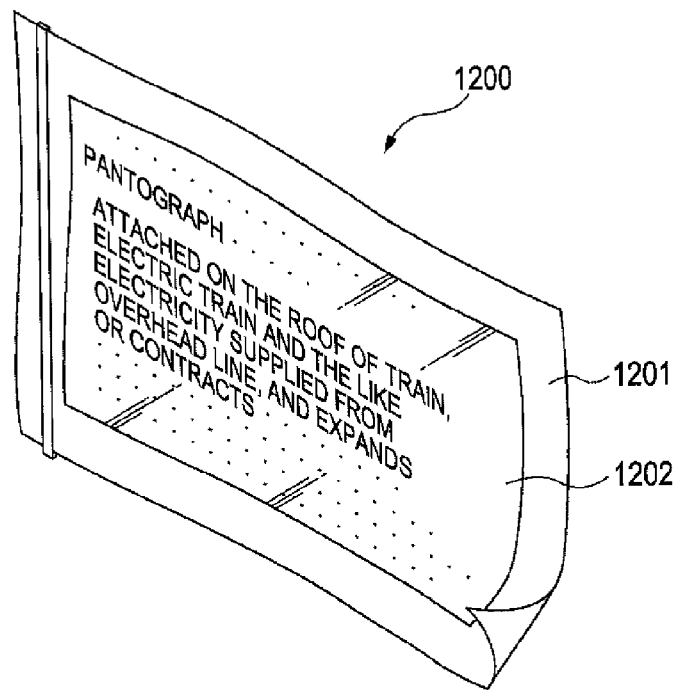

FIGS. 10A to 10C are perspective views illustrating specific examples of electronic apparatuses to which an electrophoretic display according to an aspect of the invention is applied.

FIG. 10A is a perspective view illustrating an electronic book which is an exemplary electronic device. An electronic book 1000 includes a frame 1001 in a form of a book, a cover 1002 rotatably disposed (able to open and close) with respect to the frame 1001, an operation portion 1003, and an display portion 1004 configured of the electrophoretic display according to the embodiment of the invention.

FIG. 10B is a perspective view illustrating a watch which is an exemplary electronic apparatus. A watch 1100 is provided with a display portion 1101 configured of the electrophoretic display according to the embodiment of the invention.

FIG. 10C is a perspective view illustrating an electronic paper which is an exemplary electronic apparatus. The electronic paper 1200 includes a main body portion 1201 configured of a rewritable sheet having the same texture and flexibility as a paper, and a display portion 1202 configured of the electrophoretic display according to the embodiment of the invention.

It is assumed that electronic book, the electronic paper or the like is used in a case where letters are repeatedly written on a white background. Therefore, it is necessary to resolve an afterimage at the time of erasing or a temporal afterimage.

In addition, a scope of the electronic apparatus capable of applying the electrophoretic display of the invention is not limited thereto, widely including a device using a visual change of a color tone with the migration of the charged particles.

According to the above electronic book 1000, the watch 1100 and the electronic paper 1200, the electrophoretic display according to the embodiment of the invention is adopted so that an inexpensive electronic apparatus can be provided.

In addition, the above-described electronic apparatus is not limited to a technical scope of the invention. The electrophoretic display according to the embodiment of the invention can be properly used to the display portion of the electronic apparatus such as mobile phones, portable audio devices, or business sheet such as a manual, a textbook, a workbook, an information sheet or the like.

The entire disclosure of Japanese Patent Application No. 2012-093914, filed Apr. 17, 2012 is expressly incorporated by reference herein.

What is claimed is:

1. An electrophoretic display base, comprising:
   a base;
   a partition which is disposed on one surface of the base and in which the opposite side of the one surface is open;
   an electrophoretic dispersion liquid which contains a dispersion medium and charged particles filled in a cell on the base which is defined by the partition; and
   a lid which is disposed between the partition and the base to block an opening of the partition, and has pores with a porosity configured to pass the electrophoretic dispersion liquid through the pores of the lid,
   wherein the lid has a porosity diameter greater than a diameter of the charged particles, and
   the electrophoretic dispersion liquid is filled in a plurality of cells on the base, the cells being each partitioned by the partition, the porosity of the lid being configured to pass the charged particles from one cell to another cell through the pores of the lid.

2. The electrophoretic display base according to claim 1, further comprising:
   a blocking member which blocks the porosity.

3. The electrophoretic display base according to claim 2, wherein the blocking member is configured of an adhesive which is disposed on a surface of the lid on a side opposite to a side of the lid which faces the electrophoretic dispersion liquid.

4. The electrophoretic display base according to claim 2, wherein the blocking member is configured of a release film which is detachably disposed on a surface of the lid on a side opposite to a side of the lid which faces the electrophoretic dispersion liquid.

5. The electrophoretic display base according to claim 1, wherein the lid is configured of a membrane filter having a plurality of the porosities.

6. The electrophoretic display base according to claim 1, wherein a relation of $R \leq 2 \times T/(L \times N \times g)$ is satisfied when a surface tension of the electrophoretic dispersion liquid is set to T, the longest diagonal distance of the cell is set to L, a specific gravity of the electrophoretic dispersion liquid is set to N, a gravitational acceleration is set to g, and a radius of the porosity is set to R.

7. An electrophoretic display, comprising:
   the electrophoretic display base according to claim 1; and
   a substrate,
   wherein the electrophoretic dispersion liquid is interposed between the base and the substrate.

8. An electrophoretic display, comprising:
   rhe electrophoretic display base according to claim 2; and
   at least one substrate,
   wherein an electrophoretic dispersion layer is interposed between a pair of substrates.

9. An electrophoretic display, comprising:
   the electrophoretic display base according to claim 3; and
   at least one substrate,
   wherein an electrophoretic dispersion layer is interposed between a pair of substrates.

10. An electrophoretic display, comprising:
    the electrophoretic display base according to claim 4; and
    at least one substrate,
    wherein an electrophoretic dispersion layer is interposed between a pair of substrates.

11. An electrophoretic display, comprising:
    the electrophoretic display base according to claim 5; and
    at least one substrate,
    wherein an electrophoretic dispersion layer is interposed between a pair of substrates.

12. An electrophoretic display, comprising:
    the electrophoretic display base according to claim 6; and
    at least one substrate,
    wherein an electrophoretic dispersion layer is interposed between a pair of substrates.

13. The electrophoretic display based according to claim 1, wherein the lid is a membrane filter made of polypropylene, polycarbonate, or polysulfone.

14. The electrophoretic display based according to claim 1, wherein
    the electrophoretic dispersion liquid is filled in a plurality of cells on the base, the cells being each partitioned by the partition, and
    the lid has a continuous surface extending across plural cells of the plurality of cells.

15. The electrophoretic display based according to claim 14, wherein the continuous surface of the lid extends across all cells of the plurality of cells.

* * * * *